United States Patent [19]

Stern et al.

[11] Patent Number: 5,054,059
[45] Date of Patent: Oct. 1, 1991

[54] TELEPHONE DIALING SYSTEM FOR SPECIALIZED SERVICES

[75] Inventors: Joseph L. Stern, New York, N.Y.; Fred R. Cerequas, Edison, N.J.

[73] Assignee: Stern Telecommunications Corp., New York, N.Y.

[21] Appl. No.: 426,744

[22] Filed: Oct. 24, 1989

[51] Int. Cl.⁵ .............................. H04M 1/66
[52] U.S. Cl. ......................... 379/200; 379/131; 379/112
[58] Field of Search ............... 379/188, 199, 200, 201, 379/133, 134, 136, 140, 210, 211, 212, 93

[56] References Cited

U.S. PATENT DOCUMENTS

| | | | |
|---|---|---|---|
| 4,188,508 | 12/1980 | Rogers et al. | 379/200 X |
| 4,232,200 | 11/1980 | Hestad et al. | 379/200 X |
| 4,578,540 | 3/1986 | Borg et al. | 379/200 X |
| 4,585,904 | 4/1986 | Mincone et al. | 379/200 X |
| 4,953,202 | 8/1990 | Newell | 379/200 |

Primary Examiner—James L. Dwyer
Attorney, Agent, or Firm—Darby & Darby

[57] ABSTRACT

An interactive, specialized dialing system for local control of access to a telephone line and for providing encoded information relative to an account of a user. The system includes a memory for storing program instructions, a microprocessor for directing requests for program instructions from the memory means and for responding to instructions stored in the memory for generating command signals, an interface device for interfacing with a standard telephone line, a transceiver for receiving encoded signals in standard form from the line and for decoding the signals and supplying the decoded signals to the microprocessor and also responsive to command signals from the microprocessor, for providing encoded signals in standard form to the interface device for transmission on the telephone line. The system is adapted to be interrogated by a user employing a handset coupled to the telephone line.

6 Claims, 10 Drawing Sheets

FIG. 3c
FIG. 3d
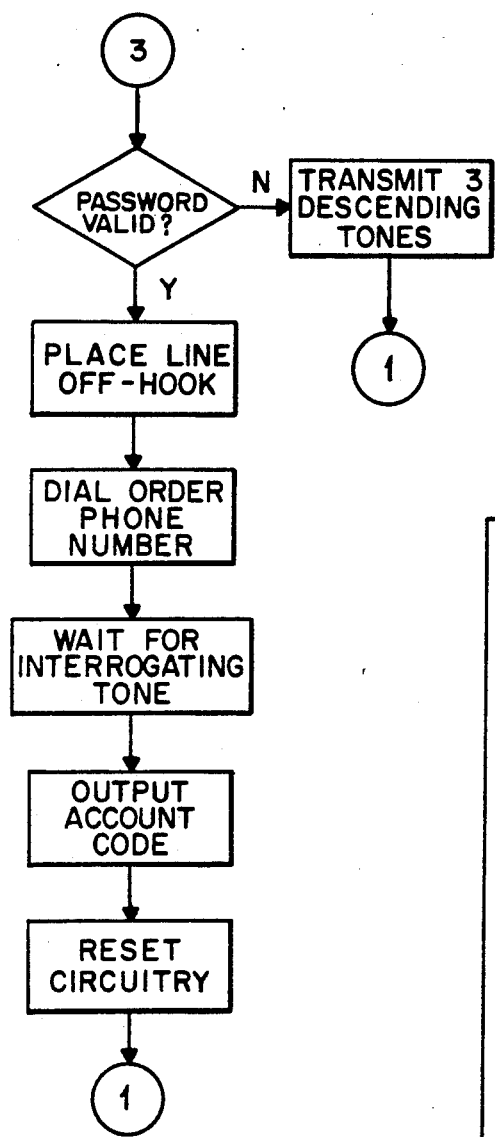
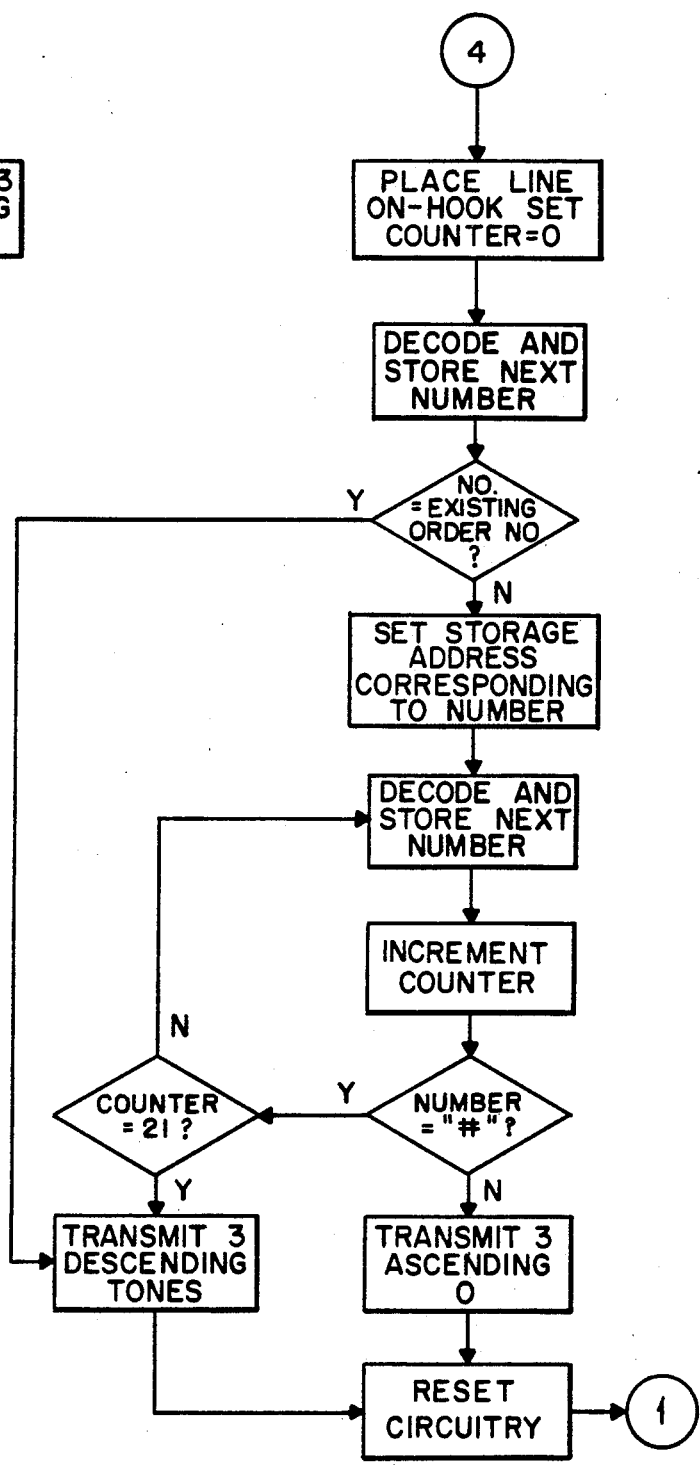

TELEPHONE DIALING SYSTEM FOR SPECIALIZED SERVICES

BACKGROUND OF THE INVENTION

1. Field of the Invention

The invention relates to a telephone dialing system for specialized services, more particularly, to such a dialing system which is capable of both interpreting the number dialed and responding to received interrogating tones.

2. Objects of the Invention

There are often situations where control of access to telephone use is desired and may be effected by employment of a password or Personal Identification Number (PIN). A related activity where interactive control of a telephone line is necessary is the requirement to supply an account code over a telephone in order to obtain a service. Typical applications of such arrangements include a system for billing hospital patients or university students for phone use through a home or office telephone bill and an automated telephone ordering system for the purchase of goods and/or services. It is with, respect to a specialized dialing system for such applications, toward which the present invention is directed.

SUMMARY OF THE INVENTION

In accordance with the present invention, an interactive, specialized dialing system for local control of access to a telephone line and for providing encoded information relative to an account of a user comprises memory means for storing program instructions, a microprocessor for directing requests for program instructions from the memory means and for responding to instructions stored in the memory, means for generating command signals, means for interfacing with a standard telephone line, means, responsive to the interface means, for receiving encoded signals in standard form from the line and for decoding the signals and supplying the decoded signals to the microprocessor and means, responsive to the command signals from the microprocessor, for providing encoded signals in standard form to the interface means for transmission on the telephone line. The system is adapted to be operated by a user employing a handset coupled to the telephone line. The system, following interrogation, provides a signal to the telephone line with encoded information related to the account of the user.

The invention also encompasses a method of using such interactive specialized dialing system for providing local control of access to a telephone line such as patient telephone access in a hospital environment comprising the steps of: detecting an incoming dialing tone indicating pick-up of a telephone for readying the system for use; checking the signal of the first digit dialed to determine if it is an inter-LATA call; disconnecting the telephone from the line if the signal from the first digit indicates it is an inter-LATA call; comparing, the signals from the initial digits dialed with stored information representing an exception list of inter-LATA calls and a list of prohibited prefixes; if the dialed area code is on the exception list, sending the dialed number over the telephone line using DTMF signals; if the dialed area code is not on the exception list and is not prohibited, sending a DTMF signal to the dialer to indicate that a password is necessary; comparing signals representing a dialed password with a predetermined, stored password pattern; if there is no match between the dialed password signals and the stored password pattern, forwarding the call by sending DTMF signals representing a stored number to a preselected operator service; if there is a match between the passwords, transmitting the dialed number using DTMF signals over the telephone line; and transmitting, upon request, an account code in DTMF signals corresponding to the dialer's line.

The method aspect of the invention of using such interactive specialized dialing system also includes using such system for automated ordering of products and services over telephone lines comprising the steps of providing and storing information representing the telephone number of a order processing center and a unique identification code, upon an order being placed by a subscriber by dialing a first non-numbered key followed by a number corresponding to the service, requesting a password to be dialed by the subscriber; comparing signals representing a dialed password with a predetermined, stored password pattern; if there is a match between the signals representing a dialed password the stored password pattern, transmitting a further DTMF signal indicating that the code number of the item desired should be entered followed by pressing a second and different non-numbered key; upon entry by the subscriber of the code number and second non-numbered key, storing said number and key information; transmitting the number of the ordering service center in DTMF signals over the phone line; upon receipt of an acceptance DTMF signal from the ordering center, transmitting the identification code of the system and the code for the item ordered by sequential DTMF signals over the phone line; the processing center also being capable of requesting confirmation of the order by the subscriber by voice request.

For a better understanding of the present invention, reference is made to the following description and accompanying drawings while the scope of the invention will be pointed out in the appended claims.

BRIEF DESCRIPTION OF THE DRAWINGS

FIGS. 3a–g represents a single flow chart of the automated ordering dialing service of the present invention.

DESCRIPTION OF THE PREFERRED EMBODIMENTS

Figure 1:
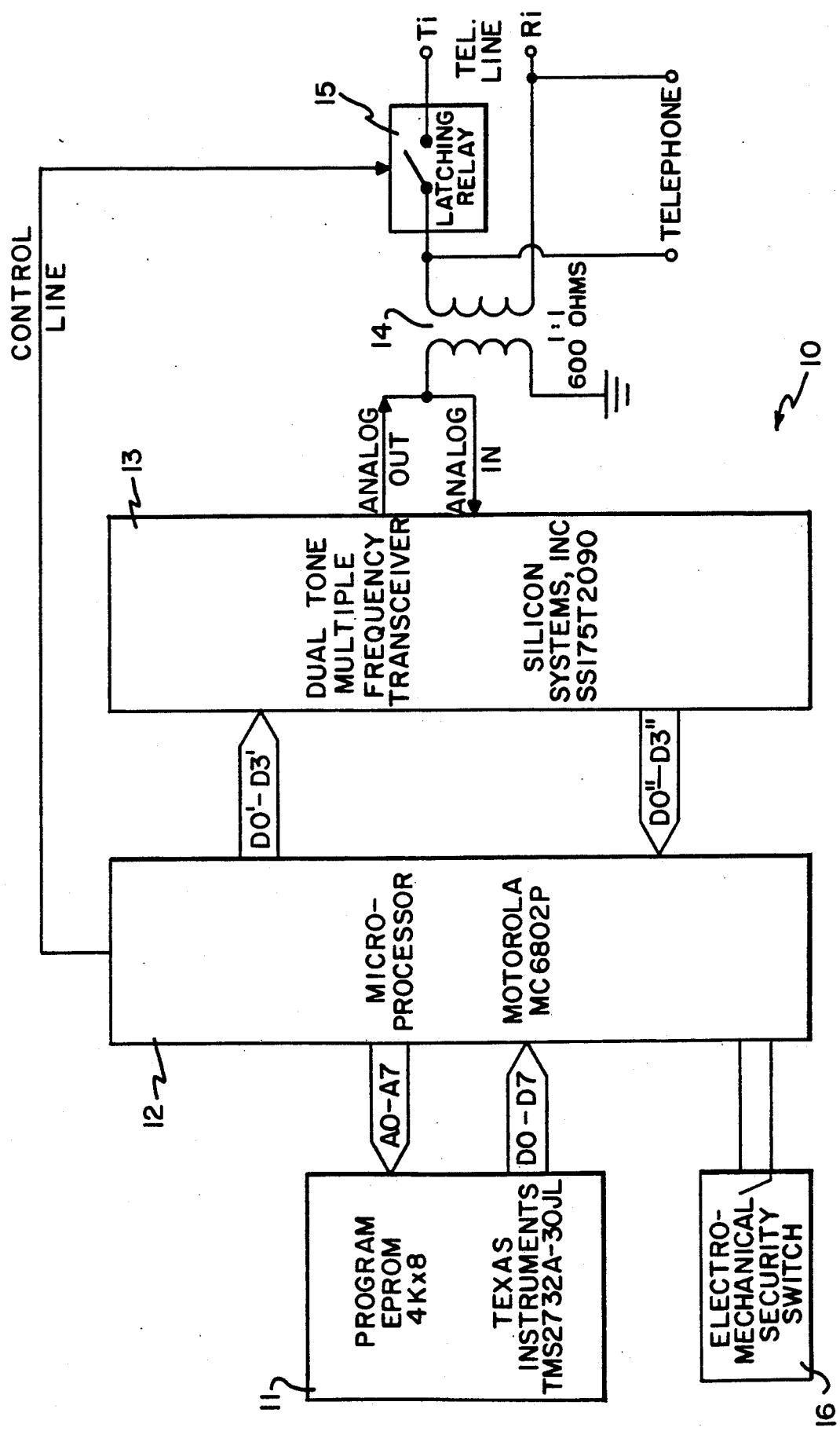
FIG. 1 is a block diagram of the specialized dialing system of the present invention.

Referring to the drawing, shown there is a specialized dialing system 10 in accordance with the present invention. The heart of the system 10 is a memory 11 for storing program instructions, typically an erasable, programmable read-only memory (EPROM); a Texas Instruments TM2732A-30JL having 4K×8 capacity may be employed. The memory 11 receives signals $A_0$–$A_7$ from the microprocessor 12 which typically are requests for program instructions. The memory provides these instructions over lines $D_0$–$D_7$ to the microprocessor 12, typically a Motorola MC6802P device. Depending on these instructions, the microprocessor 12 provides command signals $D_0'$–$D_3'$ to a transceiver 13, which produces dual tone multifrequency (DTMF or standard Touch-Tone) signals. The DTMF transceiver 13 is typically a Silicon Systems Inc. SSI 75T2090. The DTMF signals are provided by way of a 600 ohm, 1:1 transformer 14 and latching relay 15 to the telephone line.

The microprocessor 12 may be operated by a user by way of a telephone coupled to the phone line through the specialized dialing system. The dialed signal, also in DTMF form, comes, by way of the transformer 14 and relay 15 to the DTMF transceiver 13 for decoding the DTMF encoded signals and for providing, as an output, signals $D_0''-D_3''$ to the microprocessor.

The specialized dialing system 10 may be operated in numerous ways to advantage. The first is an arrangement and method for limiting access to long distance lines from a particular handset and for automatically billing long distance calls from such handset. This is the typical situation in a hospital where patients are to be billed.

Billing hospital patients requires that the system have the ability to differentiate between local and long distance calls, the ability to require a password to make long distance calls, the ability to identify the long distance calls made by each patient, and the ability to change the password for each new patient.

When the patient picks up the telephone to make a call, the DTMF transceiver 13 detects the incoming dial tone and alerts the microprocessor 12. The microprocessor 12 then requests the initial program code from the EPROM 11 and prepares to read data from the DTMF transceiver 13. The transceiver places the binary equivalent of any tones received on the data lines $D_0''-D_3''$.

The first digit dialed is checked to see if it could initiate a toll call (i.e., if it is a "1" or "9"). If it does not match the programmed criteria, the call is assumed to be local and is allowed to proceed normally.

If the first digit indicates a toll call, the microprocessor 12 triggers the latching relay open to disconnect the telephone from the line. All numbers dialed by the user on a telephone handset connected to the line are translated to binary form by the DTMF transceiver 13 and stored by the microprocessor 12 on its own random access memory (RAM) which forms part of the microprocessor chip. After the number is dialed, the system, in particular the microprocessor, compares the initial digits with an exception list of local calls which require an area code (non-toll inter-LATA) and with a list of prohibited prefixes (all stored in the EPROM).

If the area code dialed is on the exception list, the microprocessor causes the latching relay to close to reconnect the line. It then reads the number dialed from the microprocessor RAM and sequentially places these numbers on the pins $D_0'-D_3'$ causing the corresponding tones to be sent over the telephone line (by way of the interface).

If the dialed area code is not on the exception list, the microprocessor 12 will instruct the DTMF transceiver to send a tone indicating that a password must be provided by the user. The number dialed by the user will be translated by the DTMF transceiver and stored by the microprocessor in its RAM. The microprocessor will compare the password entered with the pattern previously established (and stored in the microprocessor's RAM). If the two numbers do not match, the call will be forwarded to a preprogrammed number located in an address of the EPROM such as a preselected operator service. The call will also be forwarded if the user (patient) does not respond with a password within a specified time period or if the number dialed is on the prohibited list.

Figure 2A:
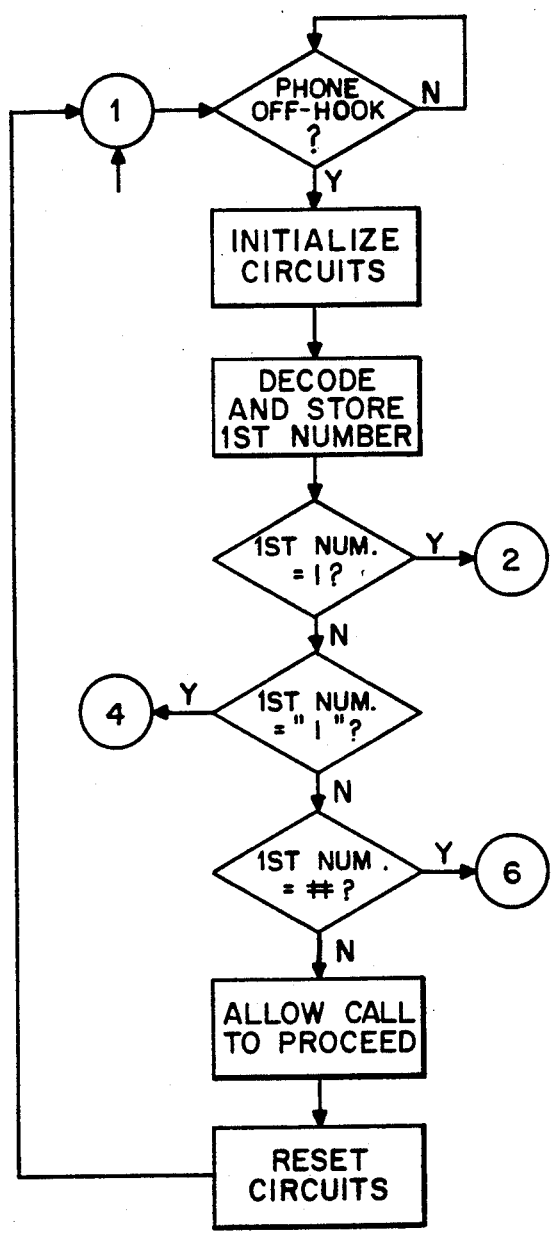
FIGS. 2a–i represents a single flow chart of the hospital telephone dialing service of the present invention.
Figure 2B:
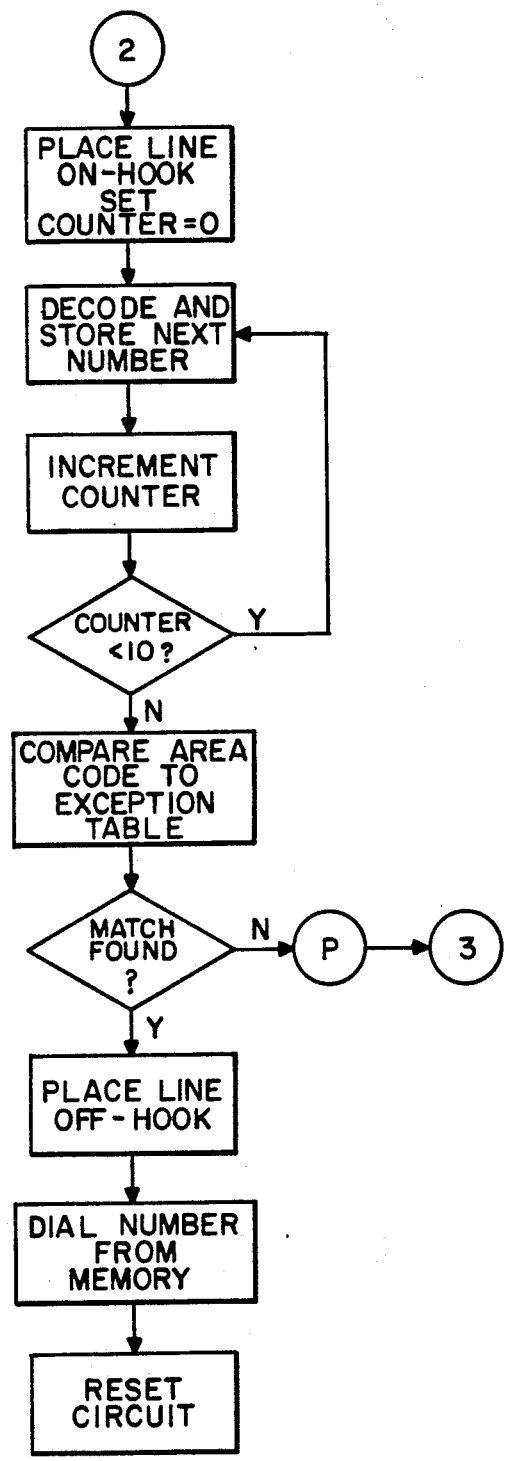
Figure 2C:
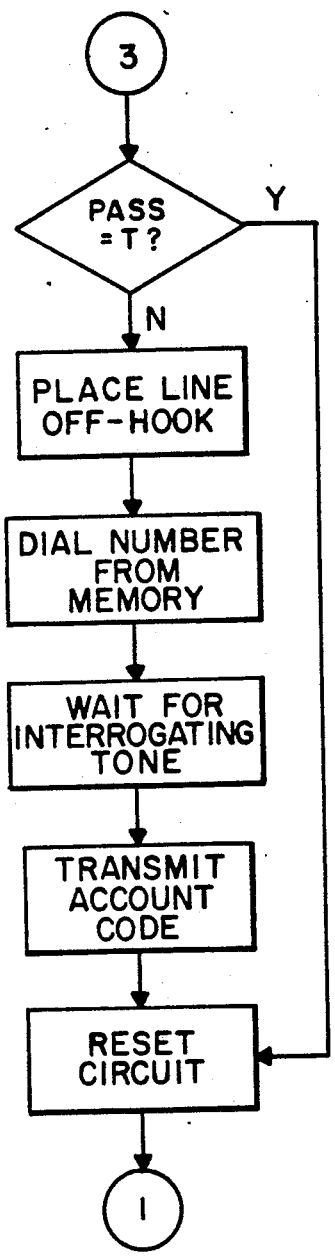
Figure 2D:
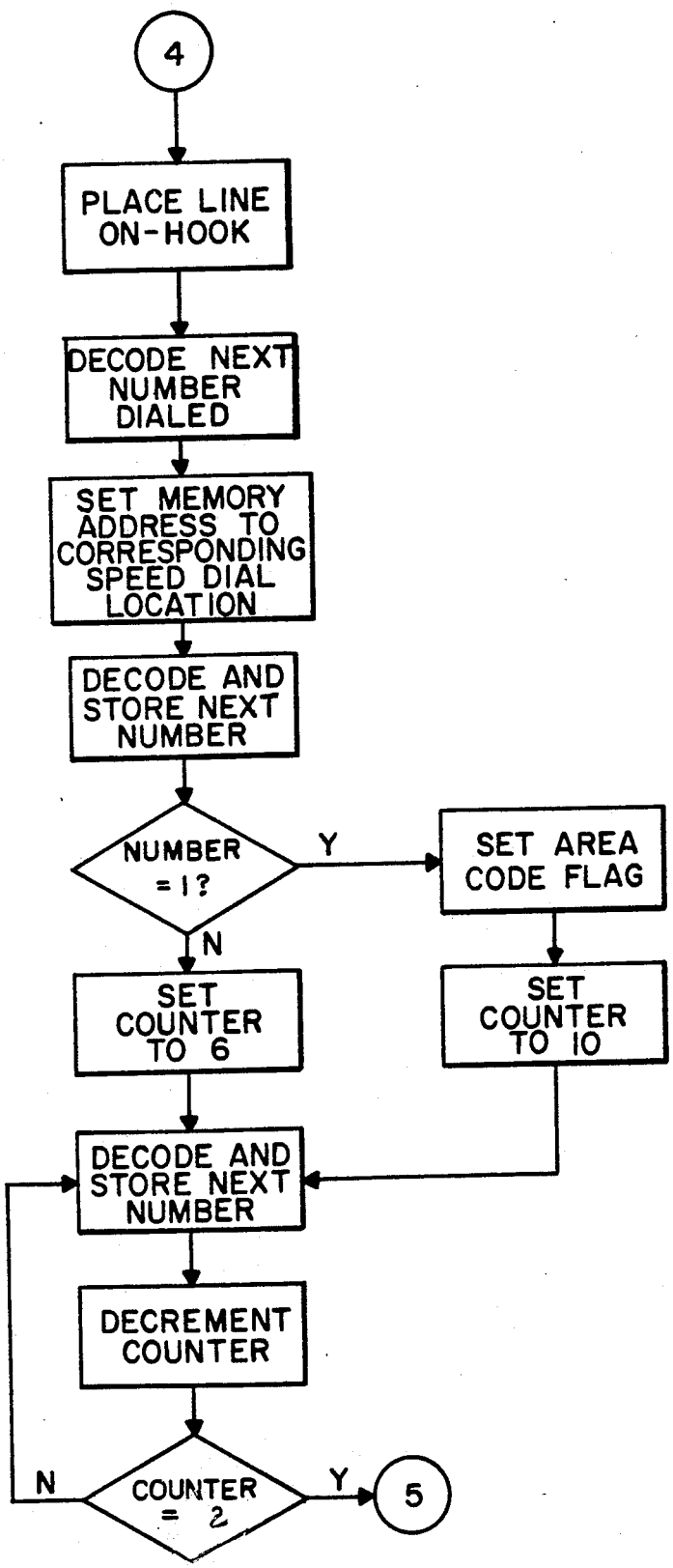
Figure 2E:
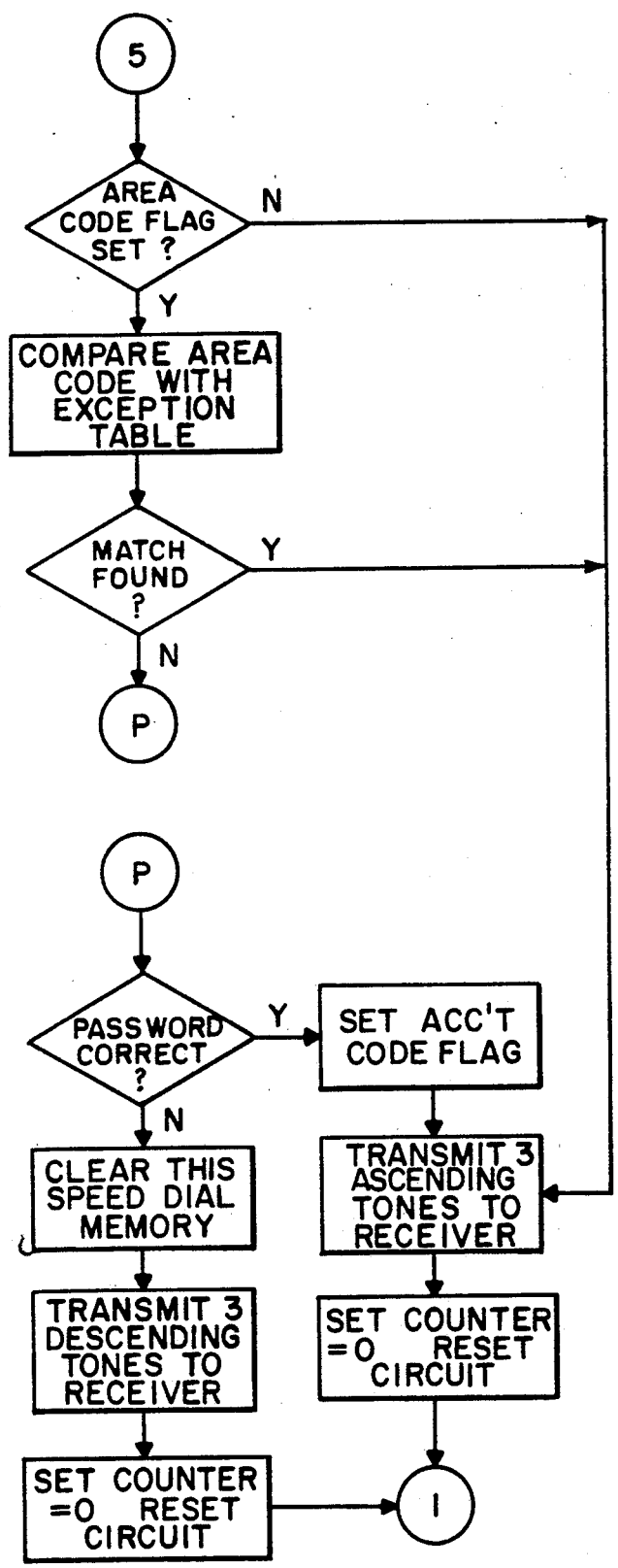
Figure 2F:
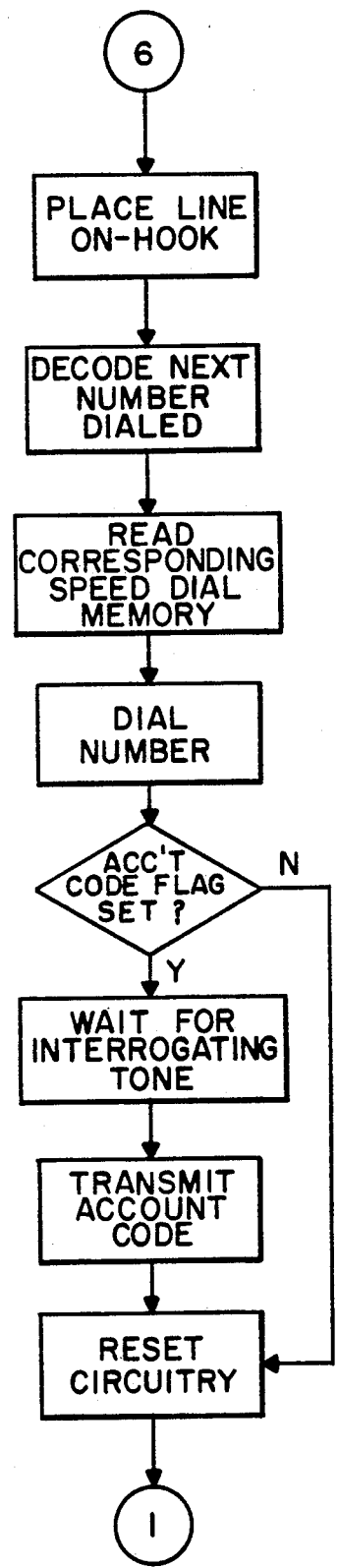
Figure 2G:
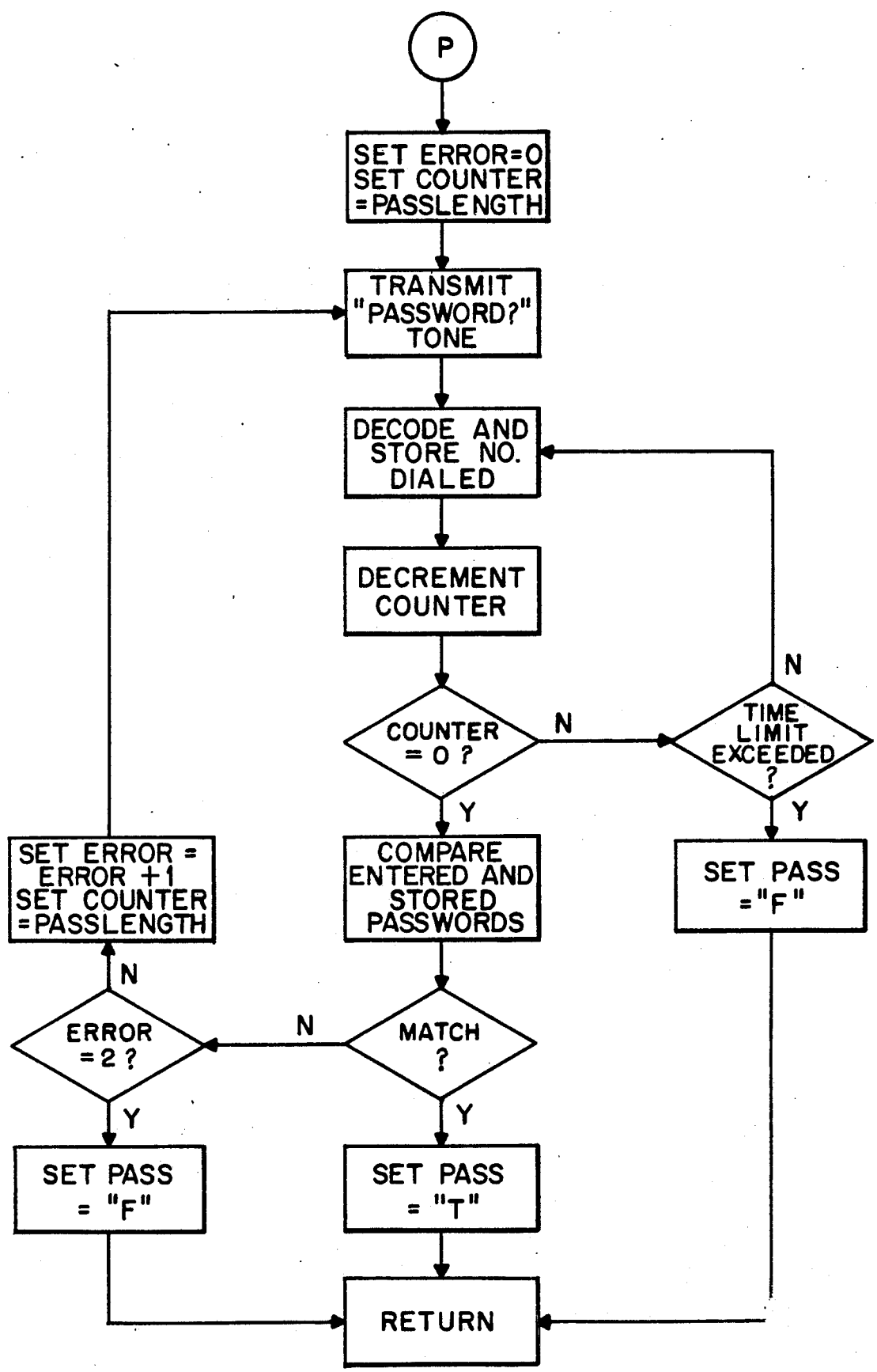
Figure 2H:
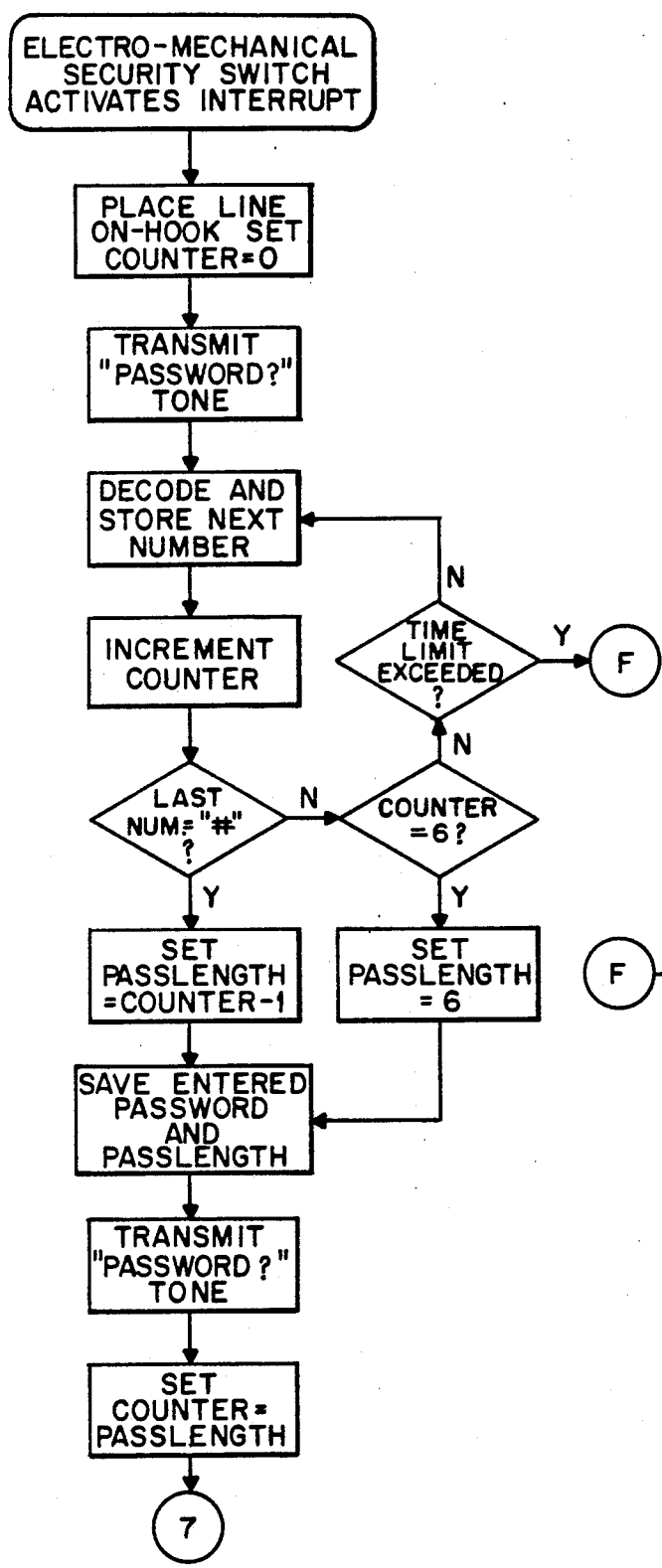
Figure 2I:
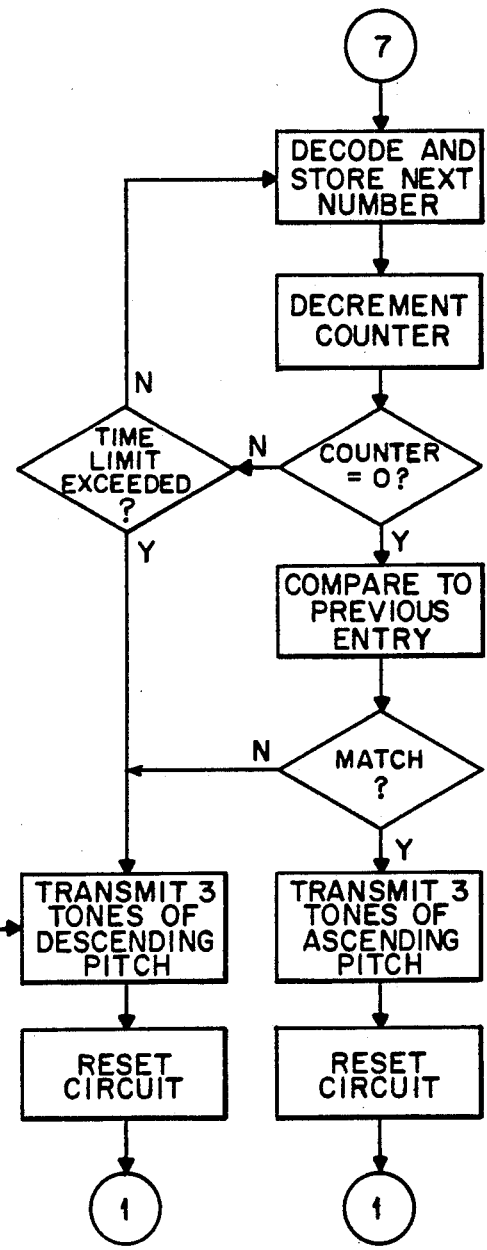

If the two passwords match, the microprocessor 12 will cause the relay to close to reconnect the line, sequentially read the number dialed from the RAM memory and place these signals across the data lines $D_0'-D_3'$ causing the DTMF transceiver to transmit the corresponding tones over the line. This will connect the user/patient with the designated long distance carrier. By prearrangement with the long distance carrier, the carrier will transmit a tone requesting an account code. The DTMF transceiver will detect this tone and signal the microprocessor. The microprocessor will then instruct the DTMF encoder to transmit the account code (stored in EPROM) corresponding to this particular line. The system 10 then becomes transparent to the user/patient until another call is made. The detailed sequence of the specialized dialing system is presented in flow chart form in FIGS. 2a-i.

Another application for which the system is able to be programmed is an automated ordering system (home shopping service). In this configuration, the system is programmed with the telephone number of an order processing center and a unique identification code. Any person subscribing to this service is provided with a specialized dialer and a list of codes to order various items. The subscriber's name, billing and mailing address are stored in a central ordering computer, maintained by the retailer, along with the identification number of the subscriber's dialer.

When a subscriber wishes to place an order, he or she will dial the "#" (pound) key followed by a number corresponding to the service they wish to order. These tones are translated by the DTMF transceiver 13 and relayed to the microprocessor 12. The microprocessor will then cause the latching relay 15 to open to break the connection to the phone line and the DTMF transceiver 13 to transmit the tone indicating that the password must be entered. The number dialed will be decoded by the DTMF decoder and stored in on-chip RAM by the microprocessor. When the complete password has been entered, the microprocessor will compare the number entered with the previously programmed password.

If the password does not match, or if it is not entered within a specified time period, the microprocessor 12 will instruct the telephone line interface 15 to reconnect the phone line. The caller will then receive a dial tone indicating that the transaction has not been completed.

If the password is entered correctly, the microprocessor 12 will instruct the DTMF transceiver 13 to transmit a second tone indicating that the number of the item desired should be entered followed by an "*" sign. These entries will be translated by the DTMF transceiver 13 and stored by the microprocessor 12 in its RAM (on chip).

The microprocessor 12 will then instruct the DTMF transceiver 13 to transmit the tones corresponding to the phone number of the ordering service center (stored in EPROM 11) sequentially over the telephone line. When the call is completed, the ordering service will transmit a tone which instructs the microprocessor 12 to transmit the auto-dialer's identification code and the code for the item ordered. The microprocessor 12 will request the identification code from the EPROM and the item ordered from its RAM memory and instruct the DTMF transceiver 13 to transmit these numbers sequentially over the line. The processing computer will evaluate these tones and respond with a voice message indicating what was ordered and a request to dial "1" to confirm or "2" to reorder. Once the order is placed and confirmed, the order processing computer will thank the customer for their order with a voice message and disconnect the line.

Figure 3A:
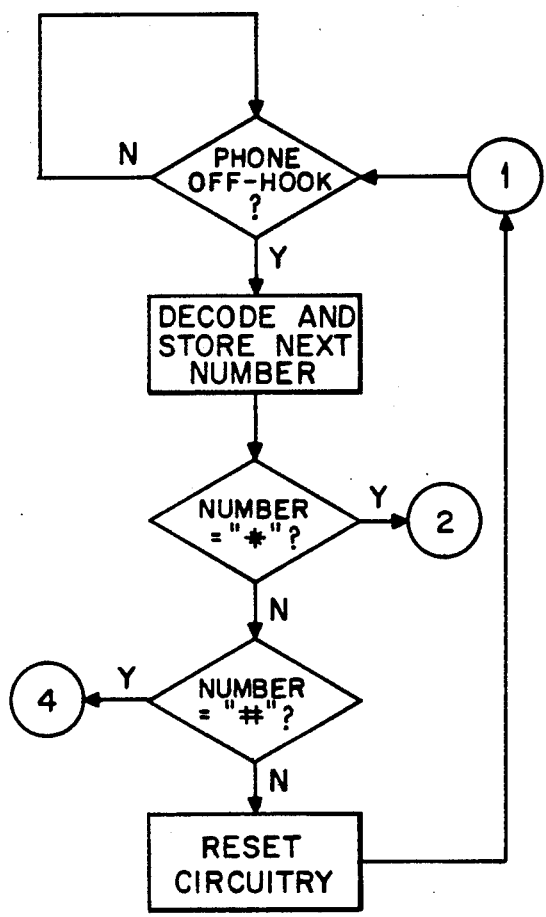
Figure 3B:
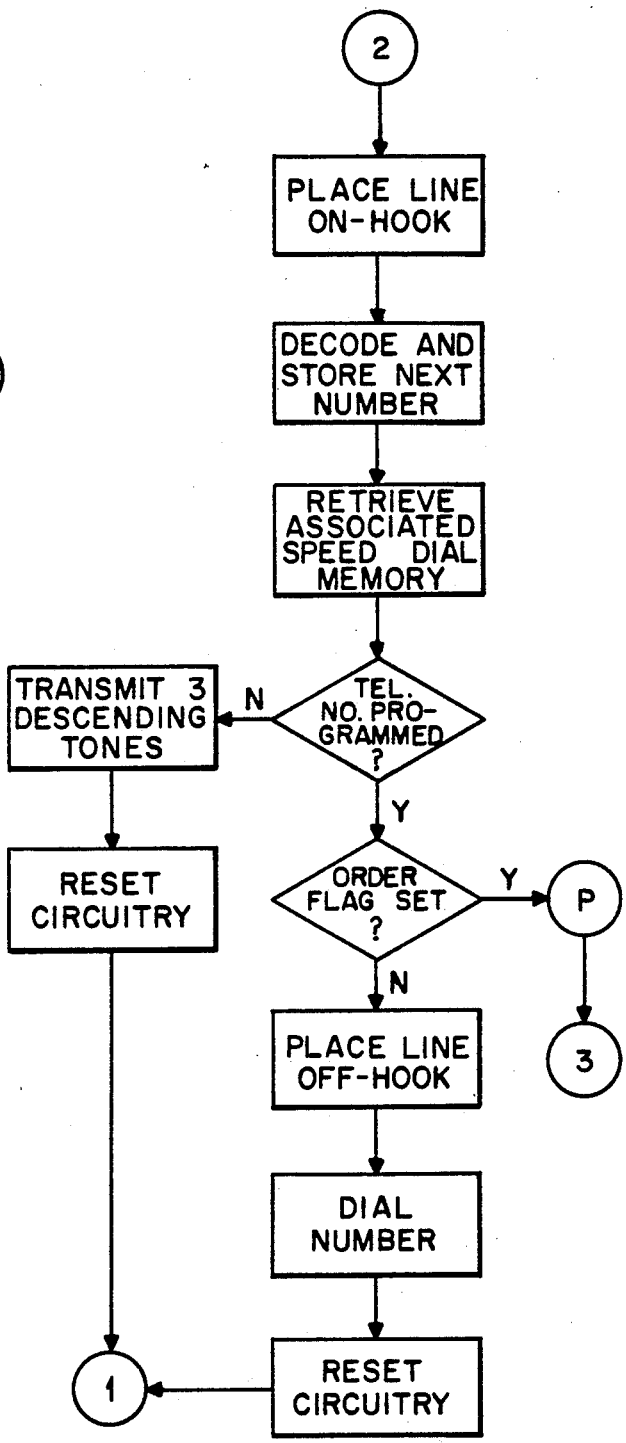
Figure 3E:
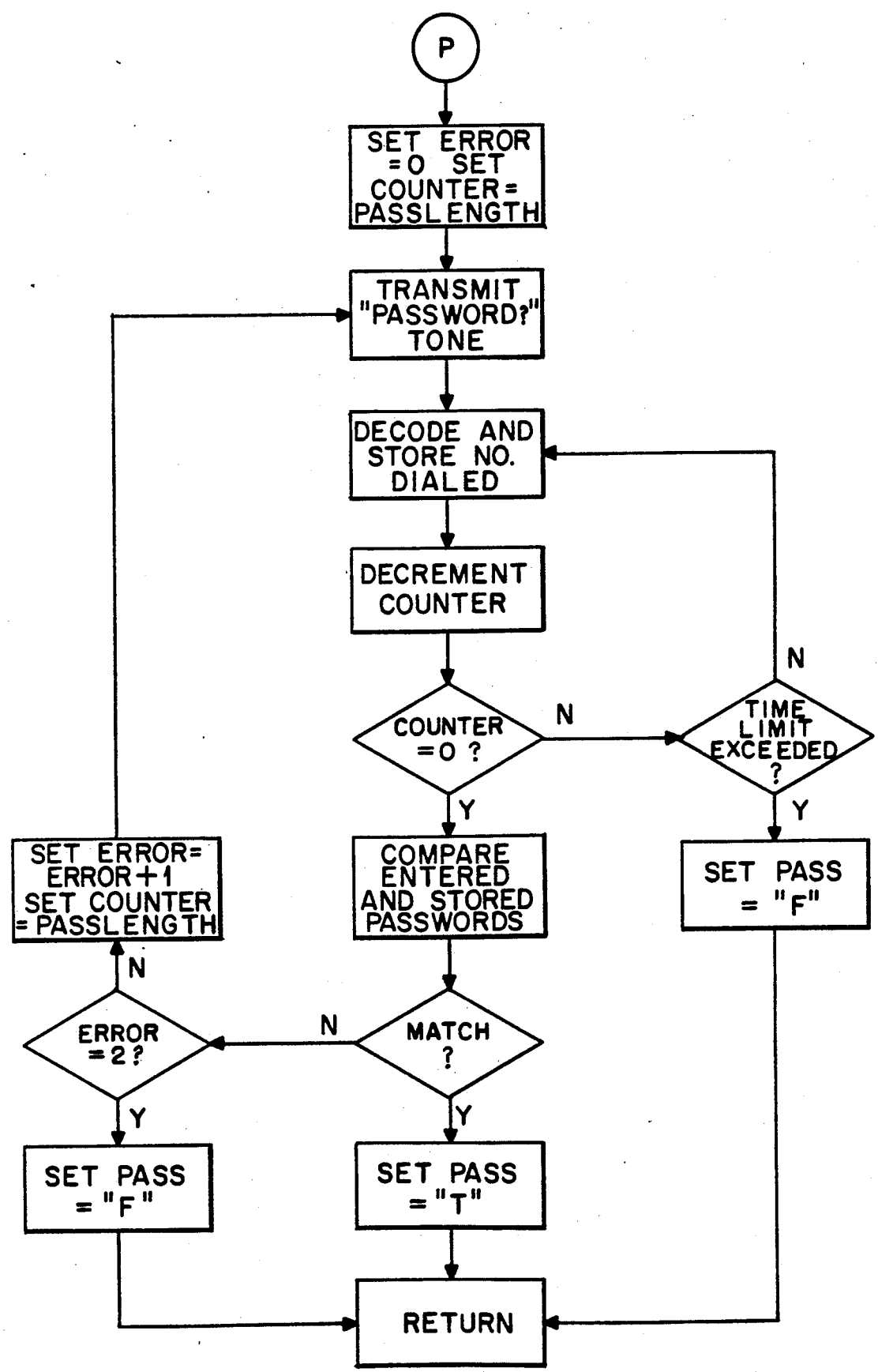
Figure 3F:
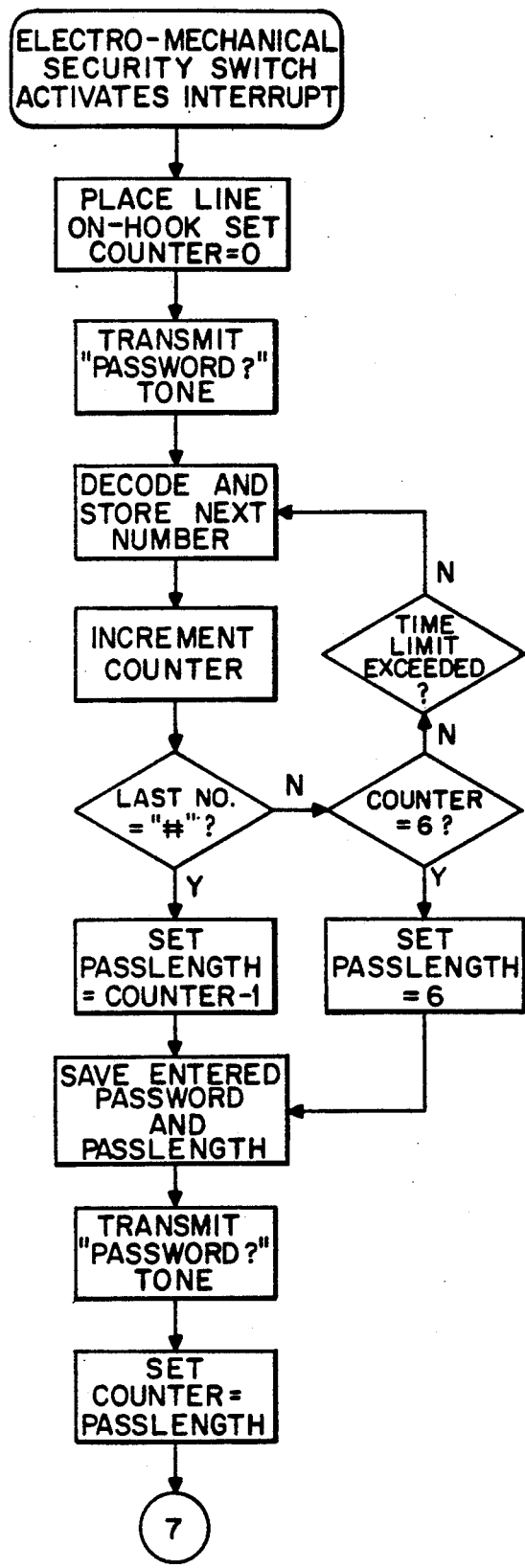
Figure 3G:
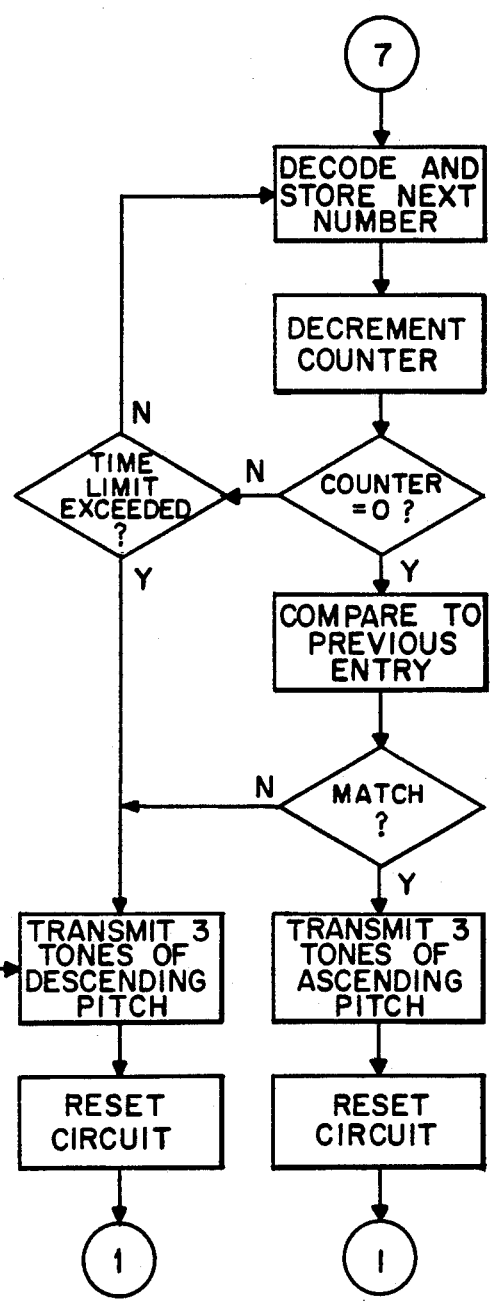

A detailed flow chart representation of the above description of the automated ordering dialing system is presented in FIGS. 3a-g.

The password in both applications will be programmed by the user. The subscriber will create the password by taking the phone off-hook and turning the key in electro-mechanical security switch 16. This will signal the microprocessor to begin the password entry program.

The microprocessor 12 will instruct the DTMF transceiver to transmit the tone to request password entry. The subscriber will then dial the desired new password followed by the "*" key. The tones generated by the telephone will be translated by the DTMF transceiver 13 and stored in on-chip RAM by the microprocessor 12. The microprocessor 12 will then instruct the DTMF transceiver 13 to again transmit the tone requesting password entry. The user will dial the new password a second time. These tones will be translated by the DTMF decoder 14 and stored in the RAM by the microprocessor 12. After this second entry of the password, the microprocessor will compare the two numbers dialed.

If the two numbers match, the new password will be stored at the RAM location reserved for the system's password. The microprocessor 12 will then instruct the DTMF transceiver to sequentially transmit three tones of ascending pitch to indicate that the new password has been accepted.

If the two entries were not the same, the old password will be maintained and the microprocessor 12 will instruct the DTMF transceiver 13 to transmit three tones descending in pitch. This will signal the user that the new password has not been accepted. The microprocessor 12 will then loop to the beginning of the password entry program and instruct the DTMF transceiver 13 to send the tone requesting a password. This cycle will continue until a new password is accepted or the "key" removed from the electromechanical security switch 16.

This description is based on the assumption that the specialized dialer is built with commercially available integrated circuits. It is also possible that all of the functions could be designed into a custom integrated circuit.

It is also evident that transceiver 13 shown as a single block, could be replaced by two separate blocks, one acting as an encoder (transmitter) and one acting as a decoder (receiver).

While the foregoing description and drawings represent the preferred embodiments of the present invention, it will be obvious to those skilled in the art that various changes and modifications may be made therein without departing from the true spirit and scope of the present invention.

What is claimed is:

1. A method of providing local control of access to a telephone line using an interactive, specialized dialing system having a memory, a microprocessor for directing requests for program instructions from the memory and for responding to instructions stored in the memory for generating command signals, device for interfacing with a standard telephone line decoder for receiving signals from the line and for supplying decoded signals to the microprocessor, and an encoder responsive to the microprocessor providing encoded signals to the interface, the method comprising the steps of:

detecting an incoming dial tone indicating pick-up of a telephone for readying the system for use;

checking the signal of the first digit dialed to determine if it is an inter-LATA call;

disconnecting the telephone from the line if the signal from the first digit indicates it is an inter-LATA call;

comparing, if it is not an inter-LATA call, the signals from the initial digits dialed with stored information representing an exception list of toll calls and a list of local non-toll inter-LATA prohibited prefixes;

if the dialed area code is on the exception list, sending the dialed number over the telephone line using DTMF signals;

if the dialed area code is not on the exception list and is not prohibited, sending a DTMF signal to the dialer to indicate that a password is necessary;

comparing signals representing a dialed password with a predetermined, stored password pattern;

if there is no match between the dialed password signals and the stored password pattern, forwarding the call by sending DTMF signals representing a stored number to a preselected operator service;

if there is a match between the passwords, transmitting the dialed number using DTMF signals over the telephone line; and transmitting, upon request, an account code in DTMF signals corresponding to the dialer's line.

2. The method of claim 1 also including the steps of predetermining and storing the password pattern prior to using the system.

3. A method for automated ordering of products and services over telephone lines using an interactive, specialized dialing system having a memory, a microprocessor for directing requests for program instructions from the memory and for responding to instructions stored in the memory for generating command signals, a device for interfacing with a standard telephone line, a decoder for receiving signals from the line and for supplying the decoded signals to the microprocessor, and an encoder responsive to the microprocessor for providing encoded signals to the interface, the method comprising the steps of:

providing and storing information representing the telephone number of an order processing center and a unique identification code;

upon an order being placed by a subscriber by dialing a first non-numbered key followed by a number corresponding to the service, requesting a password to be dialed by the subscriber by transmitting a DTMF signal to the telephone;

comparing signals representing a dialed password with a predetermined, stored password pattern;

if there is no match between the signals representing a dialed password and the stored password pattern or if the dialed password is not entered within a specific time, signaling the latch to reconnect the line resulting in a dial tone to the caller to indicate that the transaction has not been completed;

if there is a match between the dialed password signals and the stored password pattern, transmitting a further DTMF signal indicating that the code number of the item desired should be entered followed by pressing a second and different non-numbered key;

upon entry by subscriber of the code number and second non-numbered key, storing said number and key information;

transmitting the number of said ordering service center in DTMF signals over the phone line; and upon receipt of an acceptance DTMF signal from the transmitting the identification code of said system and the code for the item ordered by sequential DTMF signals over the phone line.

4. The method of claim 3 also including the step of predetermining and storing the password pattern prior to using the system.

5. The method of claim 3 wherein said first non-numerical key is a "#" (pound) key and the second non-numerical key is an "*" (asterisk) key.

6. The method of claim 3 also including the step of requesting confirmation of the order by the subscriber by voice request.

* * * * *